United States Patent Office 2,914,483
Patented Nov. 24, 1959

2,914,483

PREPARING MIXTURES OF ALKALI METAL BENZENE CARBOXYLATES AND CADMIUM BENZOATE

Jack M. Downard, Beverly, N.J., assignor to Hercules Powder Company, Wilmington, Del., a corporation of Delaware No Drawing. Application February 25, 1957
Serial No. 641,809

5 Claims. (Cl. 252—182)

The present invention relates to a process for the preparation of a uniform mixture of an alkali metal salt of a benzene carboxylic acid other than terephthalic acid and cadmium benzoate which mixture is especially useful as a feed in known methods for the manufacture of terephthalic acid.

There has recently been devised a process for the manufacture of terephthalic acid which is a practical utilization of the discovery that an alkali metal salt of a benzene carboxylic acid other than terephthalic acid can be transformed by heating at a relatively elevated temperature into the corresponding alkali metal salt of terephthalic acid. This method and various modifications thereof are described, for instance, in Belgium Patents Nos. 522,289, 524,035, and 533,755.

Summarizing the prior art process briefly, an alkali metal salt of a benzene carboxylic acid other than terephthalic acid is transformed in good yield to the corresponding alkali metal salt of terephthalic acid by heating to a high temperature in an atmosphere substantially free from oxygen. A preferred reaction temperature is from about 340° C. to 500° C. and the reaction can be carried out at any convenient pressure although a superatmospheric pressure is preferred. Also preferred is an atmosphere of an inert gas, such as carbon dioxide, nitrogen, argon, or the like, and the employment of a catalyst to promote the reaction.

One of the requirements of the prior art process is that the alkali metal salt of the benzene carboxylic acid (hereinafter sometimes referred to as the "reactant") and the catalyst be admixed intimately and uniformly in order to obtain optimum results. It has been past practice to prepare such reaction mixtures by simple mechanical procedures such as by pebble milling or the like. Preparation of reaction mixtures by mechanical procedures is on the whole satisfactory but more recently it was found that a greater degree of uniformity of the reactant and the catalyst can be achieved by dissolving the reactant and catalyst in water to form a solution and then drying the solution as, for example, by drum drying or spray drying. In this way not only is a more uniform mixture formed but also the preparation of the mixture is more convenient.

One requirement of the last mentioned method of forming a uniform mixture of the reactant and catalyst is that the solution which is prepared must have a relatively high concentration of reactant, i.e., it is not practical to form a very dilute solution of reactant because this requires the evaporation of an excessive quantity of water when the solution is dried. It is also desirable, of course, that the amount of catalyst employed be sufficient to give a good yield of terephthalic acid when the mixture of reactant and catalyst is later used as feed for the manufacture of terephthalic acid.

A most preferred embodiment of the prior art process resides in the employment of cadmium as a catalyst for the reaction. While numerous compounds of cadmium are effective catalysts, it has been found especially advantageous to employ as the catalyst a cadmium salt of a benzene carboxylic acid other than terephthalic acid (hereinafter sometimes referred to as "cadmium salt") because the use of such a catalyst does not involve the introduction of anions that are foreign to the reaction, a benzene carboxylate ion already being present as part of the reactant. Thus, the use of such catalyst eliminates the possibility of foreign anions (such as chloride ions which would be introduced by the use of cadmium chloride as the catalyst) building up in the operation of a cyclic system. Also, cadmium salts of benzene carboxylic acids have been found to be on the average at least as effective catalysts as other cadmium salts.

When it was attempted to prepare mixtures of the reactant and cadmium salt by dissolving these materials in water and drying the resultant solution, the process at first appeared impractical because the cadmium salt was found to be virtually insoluble in water in the presence of the reactant at the relatively high concentrations that are desired. Thus, for example, when it was attempted to dissolve potassium benzoate and cadmium benzoate in water in quantities sufficient to provide a 30% solution of potassium benzoate containing 1.5% by weight of cadmium, based on the amount of potassium benzoate, the cadmium benzoate could not be dissolved in the specified amount even at an elevated temperature.

In accordance with the present invention, a means has been discovered whereby the reactant and cadmium salt can be dissolved in water in desirable concentrations. The basis of this discovery is that the reactant and cadmium salt are both readily soluble in water in relatively high concentration provided there is added to the water along with these materials a small amount of a benzene carboxylic acid other than terephthalic acid to effect a lowering of the pH and provided the temperature of the water is maintained above about 80° C.

Utilizing the above discovery, there has been devised a practical and advantageous process for preparing uniform mixtures of an alkali metal salt of a benzene carboxylic acid other than terephthalic acid and cadmium salt of a similar acid which process comprises adding said alkali metal salt and said cadmium salt to water in concentrations such that the cadmium salt is at least partially insoluble at 80° C., adding a benzene carboxylic acid other than terephthalic acid in an amount to render all of said cadmium salt soluble at the specified temperature, dissolving said alkali metal salt, cadmium salt, and benzene carboxylic acid at a temperature of at least 80° C., and drying the thus formed solution to provide a dry, uniform mixture of its dissolved ingredients.

The following examples are presented for the purposes of illustration. All parts and percentages are by weight unless otherwise specified.

*Example 1*

To 70 parts of distilled water maintained at a temperature between 80° and 90° C. there was added 28.4 parts of potassium benzoate which was dissolved by agitation. There was then added 1.4 parts of cadmium benzoate but continued agitation failed to dissolve the cadmium benzoate in any appreciable quantity, the pH of the mixture at this point being about 10. Benzoic acid was then added to the solution in small increments until the pH was lowered to 7.6 at which point a clear solution was formed. The total amount of benzoic acid so added was about 0.2 part.

The clear solution prepared as above contained approximately 30% by weight of potassium benzoate and 1.5% cadmium based on the weight of potassium benzoate. While maintaining the temperature of the solution at 80° to 90° C. it was fed to a conventional drum drier and a dry, uniform mixture of potassium benzoate and cadmium benzoate was removed from the drier. This dry mixture, when heated to 450° C. in an atmosphere of carbon dioxide, was transformed to dipotassium terephthalate in a yield of 85%.

Example 2

The procedure of Example 1 was repeated employing slightly different proportions of water, potassium benzoate, cadmium benzoate, and benzoic acid, the approximate amounts of each material being as follows:

| | Parts |
|---|---|
| Water | 65 |
| Potassium benzoate | 35 |
| Cadmium benzoate | 1.05 |
| Benzoic acid | 0.15 |

At the same temperature as in Example 1, i.e., 80° to 90° C., a clear solution was formed at approximately the point when the pH of the solution had been adjusted downwardly to 7.6. The solution contained approximately 35% potassium benzoate and 1% of cadmium based on potassium benzoate. Again a uniform mixture of potassium benzoate and cadmium benzoate was obtained by drum drying the solution.

Example 3

In this example the potassium benzoate employed as the reactant was a recycled material consisting essentially of 90% potassium benzoate and 10% dipotassium terephthalate. Thirty parts of this mixture was dissolved in 70 parts of water at 80° to 90° C. and 1.4 parts of cadmium benzoate was added. A clear solution was obtained by adding benzoic acid incrementwise in the amount of about 0.3 part to reduce the pH of the final solution to approximately 6.9. Again a uniform mixture of dry materials was obtained by drum drying.

Example 4

To 50 parts of water at a temperature of 80° C. there was added 50 parts of potassium benzoate and a clear solution was formed by agitation. To this solution there was added 2.3 parts of cadmium benzoate to provide 1.5% cadmium based on the weight of potassium benzoate. The cadmium benzoate did not go into solution even through the temperature was maintained at 80° C. and agitation was supplied. Benzoic acid was added in increments to lower the pH of the mixture to 7.6 and still the cadmium benzoate did not dissolve. Distilled water at 80° C. was then slowly added to the mixture while continuing agitation; a clear solution formed when 43 parts of water had been added. The final solution contained approximately 35% potassium benzoate. It was dried as in Example 1.

Example 5

The procedure of Example 4 was repeated with the single exception that phthalic acid was added in place of benzoic acid to lower the pH of the mixture to 7.6. Thereafter distilled water was added and a clear solution formed at a potassium benzoate concentration of approximately 35%.

The examples have demonstrated the preparation of uniform mixtures of potassium benzoate and cadmium benzoate. The invention is not to be restricted, however, to mixtures comprising potassium benzoate because other alkali metal salts of benzene carboxylic acids other than terephthalic acid, such as sodium, lithium, rubidium, and cesium benzoates, isophthalates, orthophthalates, etc., can be substituted for potassium benzoate with equivalent behavior in the process of this invention. Likewise the invention can be applied to cadmium salts of other benzene carboxylic acids of the type described above.

As the examples have demonstrated, the preparation of relatively concentrated aqueous solutions of the reactant and cadmium salt can be accomplished by the addition of a benzene carboxylic acid other than terephthalic acid, e.g., benzoic acid, phthalic acid, or the like, in an amount sufficient to enable the dissolution of the cadmium salt and by maintaining an elevated temperature during formation of the solution.

As previously explained, in the process of the invention the aqueous solution that is formed should contain a relatively high concentration of reactant in order to minimize the problem of handling the solution and evaporating large quantities of water when the solution is dried. For practical purposes, the concentration of reactant should be at least about 20% of the total weight of the solution. The solution should also contain at least about 0.5% cadmium, based on the weight of reactant, since this is approximately the minimum amount of cadmium that has a near optimum catalytic effect in promoting the transformation of the reactant into dialkali metal terephthalate. The amount of cadmium can, of course, vary up to about 5% by weight of the reactant.

Working with the above concentrations of reactant and cadmium, complete dissolution of the cadmium salt cannot be achieved even at elevated temperatures. It is therefore necessary to add a small amount of a benzene carboxylic acid other than terephthalic acid in accordance with the invention to effect solubility. The amount of benzene carboxylic acid to be added is, of course, variable according to the temperature at which solution is effected and according to the concentration of the other ingredients. However, the amount of benzene carboxylic acid required at the minimum reactant and cadmium concentration, i.e., 20% and 0.5%, respectively, is that amount which is required to provide a pH of approximately 8. This maximum pH is, therefore, a direct indication of the minimum amount of benzene carboxylic acid which must be added in preparing the solution.

The exact concentrations of reactant, cadmium salt, and benzene carboxylic acid other than terephthalic acid to be employed in any given instance are subject to wide variation and suitable proportions can easily be determined by those skilled in the art. Variations in the concentration of any one ingredient will correspondingly have an effect on the amount of other ingredients which can be employed. For example, if the concentration of reactant is increased beyond the minimum of 20%, it will be necessary, in order to obtain the dissolution of the minimum amount (0.5%) of cadmium, as cadmium salt, in the solution, to employ sufficient benzene carboxylic acid to reduce the pH below the aforesaid maximum of 8. Correspondingly, if it is desired to increase the amount of cadmium above the aforesaid minimum, a pH somewhat lower than the maximum pH of 8 must be obtained by the addition of benzene carboxylic acid.

The invention can be carried out simply by adding the prescribed ingredients, i.e., reactant, cadmium salt, and benzene carboxylic acid, to water while maintaining the temperature of the water preferably from about 80° C. to 150° C. The order of addition is not important; it is preferable, however, to first add the reactant and cadmium salt and then finally to add the benzene carboxylic acid while agitating. In this way the addition of benzene carboxylic acid can be terminated conveniently as soon as complete solution is obtained; use of more benzene carboxylic acid than is necessary would be productive of no advantages.

Once the solution is prepared, a dry, uniform mixture of its solids ingredients can be obtained by any of several conventional methods of drying as, for example, drum drying or spray drying. When transferring the solution to whatever drying apparatus may be chosen, it is essential to maintain it at its elevated temperature in order to prevent the precipitation of cadmium. Other than this, no special precautions need be taken.

What I claim and desire to protect by Letters Patent is:
1. The process for preparing uniform mixtures of an alkali metal salt of a benzene carboxylic acid selected from the group consisting of benzoic acid, orthophthalic acid and isophthalic acid and cadmium salt of a benzene carboxylic acid selected from the group consisting of benzoic acid, orthophthalic acid and isophthalic acid which comprises dissolving said alkali metal salt, said cadmium salt, and a small amount of a benzene carboxylic acid selected from the group consisting of benzoic acid, orthophthalic acid and isophthalic acid in water at a temperature above about 80° C. to provide a solution having a pH less than about 8 and containing at least about 20% of said alkali metal salt based on the weight of said solution and from about 0.5 to 5% cadmium based on the weight of alkali metal salt, and drying said solution to provide a dry, uniform mixture of its dissolved ingredients.

2. The process of claim 1 in which the alkali metal salt is potassium benzoate.

3. The process of claim 1 in which the benzene carboxylic acid is benzoic acid.

4. The process of claim 1 in which the cadmium salt is cadmium benzoate.

5. The process for preparing a uniform mixture of potassium benzoate and cadmium benzoate which comprises dissolving potassium benzoate, cadmium benzoate and a small amount of benzoic acid in water at a temperature above about 80° C. to provide a solution having a pH less than about 8 and containing at least about 20% of said potassium benzoate based on the weight of said solution and from about 0.5 to 5% cadmium based on the weight of potassium benzoate, and drying said solution to provide a dry, uniform mixture of its dissolved ingredients.

References Cited in the file of this patent

UNITED STATES PATENTS 2,794,830    Raecke et al.  ----------- June 4, 1957

FOREIGN PATENTS 762,448    Great Britain ----------- Nov. 28, 1956